Figure 1:
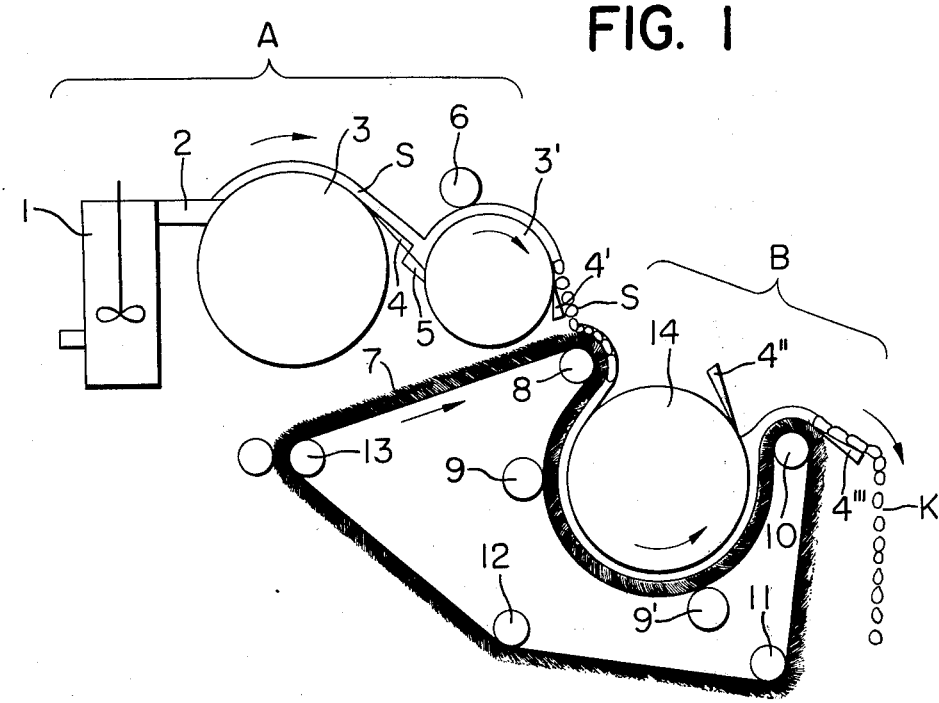

United States Patent [19]

Nakamura et al.

[11] 4,062,779

[45] Dec. 13, 1977

[54] APPARATUS FOR THICKENING AND EXTRACTING THE LIQUID FROM A SLUDGE

[75] Inventors: Shoichi Nakamura, Matsudo; Shigeaki Sasaki, Chiba, both of Japan

[73] Assignee: Ichikawa Woolen Textile Co., Ltd., Japan

[21] Appl. No.: 706,610

[22] Filed: July 19, 1976

[30] Foreign Application Priority Data

Oct. 2, 1975 Japan .................... 50-134075[U]

[51] Int. Cl.$^2$ .................................... B01D 33/04
[52] U.S. Cl. ......................... 210/386; 210/393; 210/401
[58] Field of Search ................ 210/42 R, 65–67, 210/386, 393, 400, 401; 55/386

[56] References Cited

U.S. PATENT DOCUMENTS

| 2,460,280 | 2/1949 | Finney | 210/393 |
| 3,441,951 | 4/1969 | Lee | 210/400 |
| 3,531,404 | 9/1970 | Goodman et al. | 210/66 |
| 3,815,341 | 6/1974 | Hamano | 55/486 |
| 3,897,341 | 7/1975 | Ozawa | 210/386 |

Primary Examiner—Thomas G. Wyse
Assistant Examiner—Benoit Castel
Attorney, Agent, or Firm—Bucknam and Archer

[57] ABSTRACT

An apparatus for thickening and extracting the liquid from a sludge comprises a sludge-thickening assembly wherein solid matters in the sludge are coagulated to form coagulated flocs and the floc sludge is separated and thickened, and an assembly for extracting liquid from said floc sludge under pressure to obtain a dehydrated cake. The sludge-thickening assembly comprises coagulation means for the sludge, a first and a second screen rolls having a reticulate material covering the outer surface; and the assembly for extracting the liquid comprises an endless moving flocked filter belt, means for supporting the belt, a cylinder forced to closely contact with an upper portion of said endless moving flocked filter belt, and at least one press roll urging said endless moving flocked filter belt against said cylinder.

2 Claims, 2 Drawing Figures

U.S. Patent   Dec. 13, 1977   4,062,779

APPARATUS FOR THICKENING AND EXTRACTING THE LIQUID FROM A SLUDGE

This invention relates to an apparatus for continuously thickening and extracting the liquid from sludges derived from dirty water, general sewage or various kinds of industrial effluents. More particularly, it relates to an apparatus which is adapted to efficiently treat a slurry of low solid content and to form a dehydrated cake with high solid content.

A number of apparatuses for the removal of the liquid from sludges have been heretofore proposed and used. These apparatuses comprise an assembly for the removal of the liquid, usually water, using a belt type filter, wherein the sludge is fed on a water-absorbing belt for dewatering under pressure. In this assembly, the sludge is thickened and the water is extracted by the capillary action of the water-absorbing belt and also by the compressive dewatering action exerted by press rolls. One disadvantage accompanying these apparatuses, however, is that the resulting cake has generally a water content as high as 80 - 90% and very great difficulties are encountered if an effort is made to lower the water content still further.

In general, the extracted cake is further dried and burnt in a final stage of treatment of the sludge by the use of a flash dryer, a rotary kiln, a fluidized furnace or the like.

If the water content in the cake is too high, the drying and burning efficiency are poor, with the attendant high cost of fuel for the drying and burning treatments. Accordingly, there has been a great need of an apparatus for a further extraction of the liquid, usually water, so that sludges can be dehydrated to a greater extent than with the known apparatuses.

It is therefore an object of the present invention to provide an apparatus for thickening and removing the liquid from sludges to a greater extent than with conventional apparatuses.

It is another object of the invention to provide an apparatus for thickening and extracting water from sludges in an efficient and continuous manner.

The above object can be achieved by an apparatus which comprises a sludge-thickening assembly wherein solid matters in the sludge are coagulated to form coagulated flocs, the floc sludge is then separated and thickened, and an assembly for extracting the liquid so that water is further removed from the floc sludge under pressure. The sludge-thickening assembly includes coagulation means for the initial sludge, a first and a second screen rolls each having a reticulate material covering the outer roll surface and also having therewithin a washing pipe which is arranged parallel to the roll axle and which is provided with a number of spaced nozzles positioned in the direction of width. The assembly for extraction of the water includes an endless moving flocked filter belt supported on rolls, a cylinder forced to closely contact with an upper portion of the endless moving flocked filter belt, and one or more press roll urging the moving belt against the cylinder. The floc sludge formed in the thickening assembly is continuously fed to the inlet side of a press portion defined by the contact zone of the belt and the cylinder and the resulting dehydrated cake is removed at the outlet side of the press portion by removing means.

Figure 2:
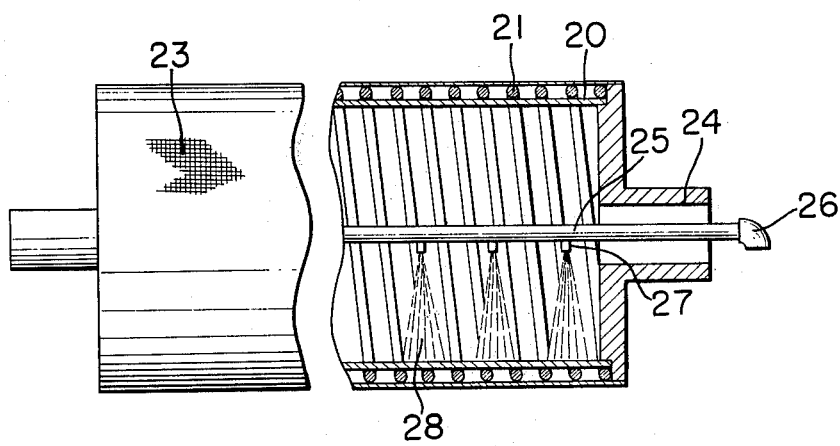

The present invention will be better understood from the following description with reference to the accompanying drawings, in which:

FIG. 1 is a diagrammatical view, in longitudinal section, of an apparatus according to the invention; and FIG. 2 is a front view, partially in section, of the screen roll of FIG. 1.

Referring now to FIGS. 1 and 2, the apparatus of the invention comprises an assembly A for thickening the sludge after coagulating solid matters in the sludge to form a coagulated floc sludge and separating the flocs from the sludge, and an assembly B for removing the liquid, usually water from the thus separated flocs or for removing water from the flocs. Assembly A comprises a coagulation or coagulating reaction vessel 1 provided with stirring means, a first screen roll 3 and a second screen roll 3' which are arranged parallel to each other at a distance. In the agitated coagulation or coagulating reaction vessel 1, to the sludge is added a coagulant to allow solid matters contained in the sludge to coagulate, thereby forming coagulated floc particles. Examples of the coagulants are inorganic, organic and polymeric compounds for instance aluminum sulfate, ferric chloride, calcium hydroxide, polyacrylamide, sodium polyacrylate, a polyamine, polyethyleneimine or a mixture thereof. Though the amount of the coagulant varies depending on the kind and concentration of the sludge, it is generally in the range of 2000-20,000 ppm in order to allow the floc particles to be formed with a relatively large size and to facilitate water to be removed from the particles.

As shown in FIG. 2, the first and second screen rolls 3 and 3' each has a roll body framed with a number of rods 20 in a cylindrical form, a wire rod 21 spirally wound at given intervals about the rod cylinder, and a reticulate material 23 covering the wire rod 21 to form a roll-like screen. The reticulate material 23 may be made of gauzes of stainless steel, phosphor bronze, plastic resins such as nylon, saran (i.e., polyvinylidene chloride), etc. The gauzes may be flocked with short or flock fibers adhesively secured to one surface thereof. The choice of the reticulate materials should preferably depend on the kind and property of the sludge. The mesh size of the second screen roll 3' is preferably finer than that of the first screen roll 3, i.e., when the reticulate material of the first screen roll 3 has a size of 10 - 40 meshes per inch, the mesh size in the second roll 3' is preferably in the range of 20 - 50 meshes per inch. The mesh size is in Tyler standard units.

Inside of each of the screen rolls 3 and 3' is provided a washing pipe 25 supported by and arranged in parallel with a roll axle 24. One end of the washing pipe 25 is connected to an exterior feed opening 26, from which wash water is supplied. The washing pipe 25 disposed within each of the screen rolls 3 and 3' is provided with nozzles 27 each downwardly directed, perpendicular to the axle, from which wash water is injected in the form of shower cones 28 to wash the reticulate material 23 from the inside thereof. Thus, the screen rolls 3 and 3' are each washed with water and dirt is removed from the rolls, so that the water removal through the screen rolls can be maintained high over a long period of time without causing any difficulties of clogging.

A sludge-removing means 4 is provided between the first and second screen rolls 3 and 3', by which the sludge S which has been gradually thickened on the first screen roll 3 is removed or scraped off therefrom and transferred on the second screen roll 3'. Indicated at 5 is a plate which serves to prevent the removed floc sludge from dropping from the removing means 4. On the second screen roll 3' is mounted a press roll 6 which gently presses the thickened floc sludge against the screen roll 3' for dehydration. Further, the second screen roll 3' is provided with another removing means 4' downstream from the press roll 6 to remove the floc sludge which has been further thickened so as to transfer the floc sludge to a subsequent stage of the assembly B for removal of the water.

The assembly for the extraction of water B includes an endless flocked filter 7 which is supported on guide rolls 8, 10, 11, 12 and 13 and moved in the direction of the arrow. The flocked filter belt is made of a base cloth with a relatively open mesh structure to which are adhesively secured flock fibers, arranged obliquely in one direction. The flock fibers may be made of a polyamide, a polyester, a polyacrylate or polypropylene or mixtures thereof. The length of the fibers is preferably between 2 mm and 15 mm and the thickness is between 10 deniers and 100 deniers. The flocked filter may be as described in U.S. Pat. No. 3,815,341 which issued on June 11, 1974. The flocked filter belt has a number of properties such as excellent ability to remove water, resistance to clogging, easy cleanability, etc. It is important, however, that the flocked filter belt be set in such a manner that the slanting direction of the flocked fibers be opposite to the moving direction of the filter belt.

The upper portion of the moving flocked filter belt 7 is forced to be in close contact with a cylinder 14 so that the moving filter belt 7 is wound around a large portion of the cylinder surface. In order to urge the flocked filter belt 7 against the cylinder 14, press rolls 9 and 9' are provided within the filter belt 7. The floc sludge thickened in the thickening mechanism A is fed onto the flocked filter belt 7 at an inlet side of a press portion defined by the contact zone of the upper portion of the moving filter belt 7 and the cylinder 14. The thickened floc sludge entering the press portion is dehydrated while being pressed against the cylinder 14.

At the outlet of the press portion is provided a cakeremoving means 4" in contact with the cylinder 14 to permit the cake on the cylinder surface to be removed therefrom. The thus removed cake is conveyed with the endless filter belt 7 and is also removed from the belt 7 at a suitable position by means of a cake-removing means 4'".

In operation, sludge and a coagulant is fed first into the agitated coagulation or coagulating reaction vessel 1 of the thickening assembly A to allow solid matters in the sludge to be coagulated into floc particles. The coagulated floc slurry is gradually force upwardly and fed in a constant amount to the first screen roll 3 through a flow box 2. Upon reaching the first screen roll 3, the floc slurry has a solid content of 1-2%. In the first screen roll 3, part of the water is removed from the floc slurry S, and the floc slurry is gradually thickened. The roll 3 is continuously washed with water to remove dirt therefrom. The thickened floc slurry on the roll 3 is removed by means of the removing means 4 and is fed through the plate 5 to the second screen roll 3'. Upon reaching the second screen roll 3', the solid content in the floc sludge ranges 3-4%.

In the second screen roll 3' the floc sludge is slightly pressed by means of the press roll 6, resulting in further extraction of water and thickening. The roll 3' is also washed with water similarly to the roll 3. The thus thickened floc sludge S is then removed by the removing means 4' and dropped on the flocked filter belt 7 of the extraction assembly B, with a solid content of 6 - 8%.

When the thus coagulated and thickened floc sludge S is transferred on the flocked filter belt 7 of the extraction assembly B at the inlet side of the press portion, a large proportion of the water in the floc sludge is absorbed by the short fibers of the filter belt 7 through capillary action and is discharged through the mesh structure of the base cloth. The resulting floc sludge supported on the flocked filter belt 7 then enters the press portion in which the same is pressed against the cylinder 14 by means of the press roll 9. As a result, a large amount of the remaining water is squeezed out through the flocked filter belt, followed by application of higher pressure by means of the press roll 9' for further dehydration.

Thus, the floc sludge S is formed into a dehydrated cake K, which is removed first from the cylinder 14 and then from the filter belt 7 at the outlet side 10 by the removing means 4" and 4'", respectively. The dehydrated cake has a solid content of 22 - 25%.

The present invention has a number of advantages. The floc sludge formed in a coagulation and separation vessel is thickened in two-stage screen rolls and the thus thickened floc sludge is pressed between a flocked filter belt and a cylinder to form a dehydrated cake, so that the thickening and extracting treatments are feasible in a continuous and efficient manner. Another advantage is that the apparatus of the invention is simple in operation and handling. In addition, the apparatus of the invention has particular utility in the treatment of a sludge with low solid content.

What is claimed is:

1. An apparatus for thickening and extracting the liquid from a sludge comprising a sludge-thickening assembly wherein solid matters in the sludge are coagulated to form coagulated flocs and the floc sludge is separated and thickened, and an assembly for extracting liquid from said floc sludge under pressure to obtain a dehydrated cake, said slugde-thickening assembly comprising coagulation means for the sludge, a first and a second screen rolls having a reticulate material covering the outer surface thereof, conduit means for communication between said coagulation means and said first screen rolls and between said first screen rolls and said second screen rolls, means for washing the reticulate material covering the outer surface of the first and second screen rolls, said screen rolls comprising a roll body framed with a plurality of rods in a cylindrical form and a wire rod spirally wound at predetermined intervals around said roll body and said reticulate material covering said wire rod, the reticulate material covering the outer surface of the second roll being of a finer mesh than the reticulate material of the first roll, and additionally comprising a press roll on said second screen roll, said assembly for extracting the liquid comprising an endless moving flocked filter belt, the fibers which constitute the flock being slanted in a direction opposite to the direction of travel of the filter belt, means for supporting the belt, a cylinder forced to closely contact with an upper portion of said endless moving flocked filter belt, said cylinder and said flocked filter belt defining a press portion having an inlet side, and at least one press roll urging said endless moving flocked filter belt against said cylinder, means for feeding said floc sludge formed in said sludge thickening assembly onto the flocked filter belt at the inlet side of said press portion of said extraction assembly defined by the contact zone of said endless moving flocked filter belt and said cylinder, and means for removing the resulting dehydrated cake at the outlet of said press portion.

2. The apparatus according to claim 1 wherein the means for washing said reticulate material comprise a pipe within said screen rolls arranged in parallel with the axles of the rolls, means for supplying wash water to said pipe and a plurality of nozzles perpendicular to the axle of said rolls.

* * * * *